[11] 3,585,418

[72] Inventor Donald J. Koneval
Lyndhurst, Ohio
[21] Appl. No. 843,438
[22] Filed July 22, 1969
[45] Patented June 15, 1971
[73] Assignee Clevite Corporation

[54] PIEZOELECTRIC RESONATORS AND METHOD OF TUNING THE SAME

4 Claims, 6 Drawing Figs.

[52] U.S. Cl. .................................................. 310/8.2, 310/9.4, 310/9.6, 310/9.7, 333/72
[51] Int. Cl. .................................................. Holv 7/00
[50] Field of Search .......................................... 310/8.2, 9, 9.5, 9.1, 9.2, 9.7, 9.4, 9.6; 333/72

[56] References Cited

UNITED STATES PATENTS

| | | | |
|---|---|---|---|
| 2,486,916 | 11/1949 | Bottom | 310/9.1 X |
| 3,382,381 | 5/1968 | Horton | 310/8.2 |
| 3,401,276 | 9/1968 | Curran et al. | 310/9 |
| 3,401,283 | 9/1968 | Curran et al. | 310/9.5 |
| 2,956,184 | 10/1960 | Pollack | 310/8.2 |
| 2,486,968 | 11/1949 | Moulton | 310/8.3 |
| 2,159,891 | 5/1939 | Guerbilsky | 310/8.2 |
| 3,365,591 | 1/1968 | Koneval et al. | 310/8.2 |

*Primary Examiner*—D. F. Duggan
*Assistant Examiner*—B. A. Reynolds
*Attorney*—Eber J. Hyde

ABSTRACT: There is disclosed a high frequency piezoelectric resonator having an electroded region and a surrounding nonelectroded region, said resonator having means for suppressing spurious responses comprising a layer of nonabsorbent, insulating and high Q material, said layer being deposited on said nonelectroded region in a collarlike configuration. Also, said layer has been shown to serve as an effective means for fine-tuning piezoelectric resonators.

INVENTOR.
DONALD J. KONEVAL
BY
Elber J. Hyde
ATTORNEY

PIEZOELECTRIC RESONATORS AND METHOD OF TUNING THE SAME

The present invention relates generally to piezoelectric resonator elements and the method of fine-tuning the same. More specifically, the invention is directed to suppression of unwanted modes of vibration in quartz resonators for use in high frequency filter circuits, especially those operating over 5 megacycles.

Use of piezoelectric resonators in electric filter circuits has been known for years, particularly in those operating at low frequencies. The advent of miniaturization and the constant demand for high frequency filter circuits, however, have presented researchers with considerable difficulties insofar as having suitable resonator elements that are capable of operating at specific vibratory modes, yet free of spurious responses.

The prior art provides a number of different techniques and methods for reducing unwanted and spurious responses in piezoelectric resonator elements. Efforts to solve this significant problem, by changes in dimension and/or configuration of the particular resonator element, have proven either impractical or costly. With the introduction of the energy trapping theory, as disclosed in U.S. Pat. Nos. 3,401,283 and 3,384,768, it became possible to predict quantitatively the conditions for the trapping, as well as the nontrapping, of unwanted modes in AT-cut quartz wafers. In U.S. Pat. No. 3,384,768 there are disclosed resonator structures in which wave propagation beyond the electroded region is minimized to thereby reduce the "range of action" and maximize the mechanical Q. This is accomplished by structurally establishing a relationship between the resonant frequency $f_a$ of the electroded region and the resonant frequency $f_b$ of the surrounding nonelectroded region of the wafer whereby the frequency $f_b$ acts as a cutoff frequency for the propagation of the vibratory mode from the electroded region. The relationship is preferably such that $f_a 1 f_b$ is in the range of 0.8 to 0.99999. One method of accomplishing this frequency relationship is to utilize a calculated electrode thickness relative to the thickness of the wafer to effect a predetermined mass loading of the electroded region whereby resonant frequency is decreased relative to that of the surrounding wafer material.

If the required relationship between electrode dimensions and the frequency relation $f_a/f_b$ is maintained, unwanted responses with frequencies less than $f_b$ cannot exist. At frequencies higher than $f_b$, however, mode propagation can occur in the nonelectroded region of the wafer and the reflection, from the wafer edge, can set up a system of standing waves in the nonelectroded region of the wafer. The resulting unwanted responses are observed above the cutoff frequency $f_b$ and can degrade resonator's performance. The existence of these unwanted modes is dependent on the surface uniformity and boundary conditions at the wafer edge, whereas the magnitude is dependent on the diameter to thickness ratio of the wafer and the frequency difference between the unwanted mode and the principal mode. Thus, attenuation of the unwanted modes above $f_b$ decreases if the diameter to thickness ratio and/or the frequency difference is decreased.

In U.S. Pat. No. 3,365,591, which applies the energy trapping theory mentioned above, there is disclosed a means for reducing spurious responses in a wafer-type resonator by forming a layer of high Q insulating material of predetermined thickness on the surface of the wafer including both the electroded and nonelectroded regions. Furthermore, the layer is provided with a peripheral edge having particular configurations such as beveled or sawtooth types.

In general, however, it should be noted that the prior techniques and/or structures, to reduce spurious responses, especially in AT-cut quartz crystals, are based on a theoretical approach and, therefore, are applicable to quartz crystals of excellent qualities. Thus, in many high frequency filter applications it is essential that the quartz wafer's major surfaces be flat, uniform, and particularly parallel. These properties are attained only at high cost. It is believed that the one significant cause contributing to the rise of unwanted responses is the fact that the major surfaces of the wafer are not exactly parallel throughout. In practice, perfect parallelism is accomplished only in the central region of a thin quartz wafer. This is not so at the edge region where the thickness of the wafer tends to decrease with the thinner edges generating frequencies higher than those observed in the central region, giving rise to spurious responses. In this connection, it should be mentioned that major surfaces of high quality wafers are generally parallel to about ½λ of sodium light and excellent quality wafers are parallel to about ¼λ of sodium light. Spurious responses are observed even with wafers of excellent quality.

It is a principal object of the present invention, therefore, to provide a low-cost, wafer-type resonator having means for substantially eliminating spurious responses.

Another object of the invention is to provide an all-quartz resonator having essentially no spurious responses.

Another object of the invention is to provide a method and means for fine-tuning high frequency quartz resonators.

Other objects and advantages of the invention will become more apparent from the following description as viewed in connection with the accompanying drawings wherein:

FIGS. 1 and 1*a* are perspective views of resonators in accordance with the invention;

Figure 1:
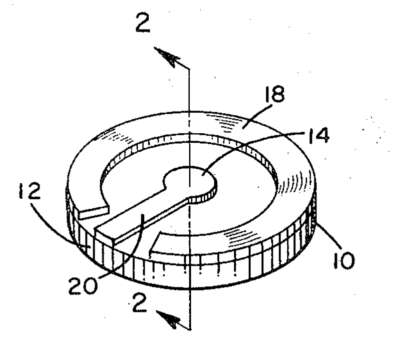
Figure 1A:
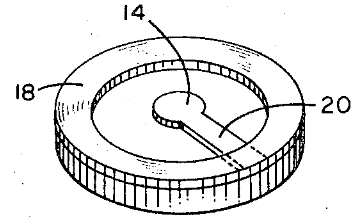

Referring to FIGS. 1 and 1*a* of the drawings there is shown a resonator in accordance with the invention identified generally by the reference numeral 10. The resonator 10 comprises a quartz wafer substrate 12 having a circular electrode 14 formed by suitable means on the upper major surface thereof defining an integral lead portion 20 extending to the wafer edge to provide connection with an electrical circuit. A layer 18 of collarlike configuration is suitable formed on the upper and/or lower major surface of wafer 12. Preferably, wafer 12 is made of quartz and suitable for high frequency operations. Because an AT-cut quartz crystal responds in the thickness mode to a potential gradient between its major surfaces it is particularly suitable for high frequency applications and the invention will thus be described with relations to said crystals.

In accordance with the invention at least one major surface of wafer 12 is provided with a layer 18 of a high Q, insulating and nonabsorbent material. Layer 18 is deposited in the configurations indicated in FIGS. 1 and 1*a* by utilizing vapor deposition techniques. The oxides of silicon, i.e., $Si0$, $Si0_2$ and $Si_20_3$ are generally nonabsorbent, insulating, and of sufficiently high Q that they comprise the preferred materials for layer 18. Other materials may be used, in part, such as gold over chromium. However, in this case, care should be exercised so that lateral conduction is not realized.

The invention contemplates in general a resonator structure satisfying the energy trapping theory providing a frequency relationship between the frequency of the electroded region $f_a$ and the frequency of the nonelectroded region $f_b$ whereby $f_a/f_b$ is in the range of 0.80000 to 0.99999. The layer 18 serves as an effective means for suppressing unwanted and spurious responses encountered in the operations of most quartz crystals especially in high frequency applications. In the preferred embodiments shown in FIGS. 1 and 1*b* the wafer 12 does not have to be of high or excellent quality, i.e., the major surfaces are parallel to about ½λ of sodium. As discussed hereinabove, the wafer will have undesirable spurious responses irrespective of its quality, though in different degrees. The layer 18 is deposited on wafer 12 thereby correcting its surface imperfections and thus eliminating the spurious responses. The thickness of layer 18 is not critical and generally does not have to be predetermined. In practice the thickness of layer 18 is usually increased so long as spurious responses are observed. In a technical sense, there exists an optimum thickness for each quartz wafer, but such thickness is not necessary to predetermine because layers thicker than required have not been shown to be harmful to the performance of the resonator.

Figure 2:
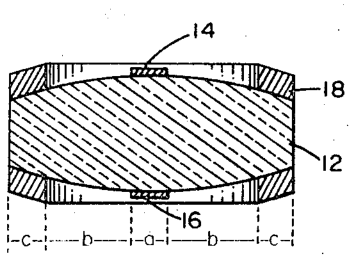
FIG. 2 is a section taken along the line 2–2 of FIG. 1.

Now referring to FIG. 2 of the drawings there is shown a cross section of resonator 12 with layer 18 being deposited on both major surfaces. The cross section depicted in FIG. 2 defines three regions of varying frequencies. Region *a* having a resonant frequency $f_a$ determined, among other things, by the thickness of the wafer and densities of the electrodes 14 and 16. The surrounding nonelectroded Region *b* has a resonant frequency $f_b$ higher than $f_a$ and the edge Region *c* having still an average resonant frequency $f_c$ higher than $f_b$. In quartz wafers of excellent quality $f_c$ is usually very close to $f_b$ because of the near-perfect parallelism observed with said wafers. However, as the quality of the wafer becomes more inferior the difference between $f_b$ and $f_c$ becomes greater due to the thinner edge region *c* generating frequencies $f_c$ higher than $f_b$, said frequencies $f_c$ reflecting at the edge and causing the spurious responses. The purpose of layer 18 is essentially to correct the edge region *c* loading it in such a manner as to eliminate the higher frequencies generated and subsequently eliminate the spurious responses.

Figure 4:
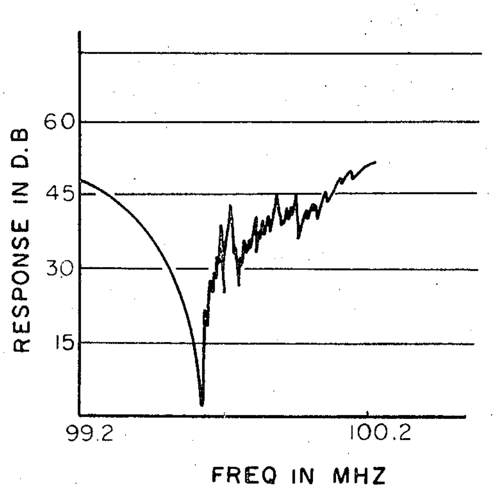
FIGS. 4 and 5 are curves illustrating one of the advantages of the invention.
Figure 5:
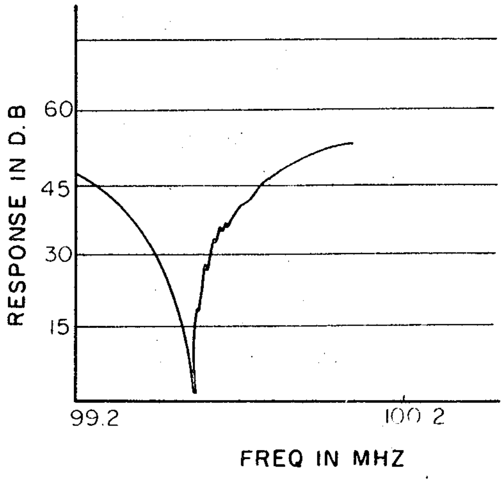

Referring to FIGS. 4 and 5 there is illustrated one of the advantages of the present invention. FIG. 4 is a response curve of an AT-cut quartz wafer of excellent quality, i.e., major surfaces parallel to ¼λ of sodium light. It can be seen that spurious responses are quite evident. FIG. 5 represents the response curve of the same AT-cut quartz wafer on which was deposited a collarlike layer of SiO, 0.5 mm. wide. It is obvious that the unwanted frequencies have been substantially eliminated. With low-cost, inferior-quality crystals the suppression of unwanted responses is much greater rendering said crystals suitable for use in many high frequency applications heretofore restricted only to crystals of high and/or excellent quality.

Layer 18 must have good adherability to the quartz wafer to maintain the high mechanical Q of the resonator. Of course, layer 18 itself must be made of a high Q material, being preferably silicon monoxide, silicon dioxide, and/or silicon sesquioxide. Adhesion of layer 18 to the quartz wafer may be improved by having an intermediate layer of chromium inbetween, said layer being sufficiently thin as to allow no lateral conductivity.

It is important that layer 18 be deposited only on the nonelectroded region. While the thickness of layer 18 is not critical to the performance of the resonator, its distance from the electroded region is important. For effective operation, it has been found that the annular collar configuration of layer 18 should be at least a distance of $2a$ from the electroded region, *a* being the radius of the electroded region. If layer 18 is deposited on both the electroded and nonelectroded regions the frequency relationship between them would be maintained and therefore would not suppress the spurious responses generated in the nonelectroded region.

Figure 3:
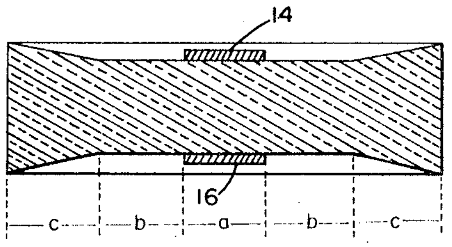
FIG. 3 is a cross section of one embodiment of the invention.

Referring now to FIG. 3 of the drawings there is shown a cross section of a quartz resonator representing an embodiment of the invention. Here the quartz wafer is fabricated with an elevated edge as means for suppressing the spurious responses. Of course, the resonator satisfies the energy trapping theory with respect to the electroded and nonelectroded region whereby $f_{ab}$ being in the range 0.80000 to 0.99999. In this embodiment the frequencies $f_c$ generated at the elevated edge are lower than $f_b$ which operates as a cutoff frequency suppressing the spurious responses. The elevated edge, similar to layer 18, should be at a distance of $2a$ from the electroded region, *a* being the radius of said region.

A distinct advantage of the present invention relates to the utilization of layer 18 as means for fine-tuning high frequency resonators. It is well known that tuning of a resonator is effected by the deposition of a layer of dielectric material on the electroded region or the entire resonator. Restricting the deposition to the nonelectroded region, however, has provided a very efficient method of fine-tuning resonators. For example, a frequency lowering of 80 $kH_z$. Z. is obtained when a relatively thick collar of SiO is deposited on the nonelectroded region of a quartz wafer (fifth harmonic at 100 MHz.) This is a lowering of less than 0.1 percent. If the SiO is deposited on the entire resonator the frequency is lowered about MHz. or 1 percent.

While there have been described what are believed to be the preferred embodiments of this invention, it will be obvious to those skilled in the art that various changes and modifications may be made without departing from the invention, and it is aimed, therefore, to cover in the appended claims all such changes and modifications as fall within the scope of the invention.

What I claim is:

1. A high frequency piezoelectric resonator comprising: a thin quartz wafer having an electroded region and a surrounding nonelectroded region; and a layer of high Q, nonabsorbent insulating material substantially surrounding said nonelectroded region.

2. A high frequency piezoelectric resonator as described in claim 1 wherein said layer comprises a vapor-deposited member of the group consisting essentially of silicon monoxide, silicon dioxide, and silicon sesquioxide.

3. In a high frequency piezoelectric resonator comprising an electroded region having a frequency $f_a$ and a nonelectroded region having a frequency $f_b$, said frequencies $f_a$ and $f_b$ being in the range of 0.80000 to 0.99999, a means for suppressing spurious responses comprising in combination to a collarlike layer of high Q, nonabsorbent and insulating material, being deposited on at least a portion of said nonelectroded region, and substantially surrounding said electroded region.

4. A high frequency piezoelectric resonator comprising a quartz wafer having an electroded region having a resonant frequency $f_a$ and a nonelectroded region having a frequency $f_b$, said frequencies $f_a$ and $f_b$ being related whereby $f_a/f_b$ being in the range of 0.80000 to 0.99999, and an elevated collarlike edge region tapering upwardly from said nonelectroded region to effectively suppress spurious responses of the resonator.